T. C. STARK.
Steam-Plow.

No. 166,230. Patented Aug. 3, 1875.

Witnesses
Geo. H. Strong
Jno. L. Boone

Inventor
Theodore C. Stark
by Dewey & Co
Attys

UNITED STATES PATENT OFFICE.

THEODORE C. STARK, OF VALLEJO, CALIFORNIA.

IMPROVEMENT IN STEAM-PLOWS.

Specification forming part of Letters Patent No. 166,230, dated August 3, 1875; application filed June 12, 1875.

*To all whom it may concern:*

Be it known that I, THEODORE C. STARK, of Vallejo, Solano county, State of California, have invented an Improved Plowing-Machine; and I do hereby declare the following description and accompanying drawings are sufficient to enable any person skilled in the art or science to which it most nearly appertains to make and use my said invention or improvement without further invention or experiment.

My invention relates to an improved machine for plowing and cultivating the soil, which can be either propelled by steam or drawn over the ground by horses.

In my improved machine I use a series of ordinary plows ranged across the rear end of the wagon or plow-frame; and the main feature of my invention consists in the employment of two or more parallel independent sliding plow-beams, to each of which one or more plows are attached. These sliding plow-beams are so connected with pulleys, cranks, or equivalent mechanism, that as the wagon or plow-frame progresses they are separately and alternately drawn upon, so that the plows which are attached to each beam, after they are pulled forward by the semi-rotation of its crank or pulley, will remain stationary during the back movement of the crank or pulley, while the other plows are being drawn forward in the same manner, thus drawing the entire series of plows through the ground while only one beam with its plows are working at one time.

In order to more fully illustrate and explain my invention, reference is had to the accompany drawing forming a part of this specification, in which—

Figure 1:
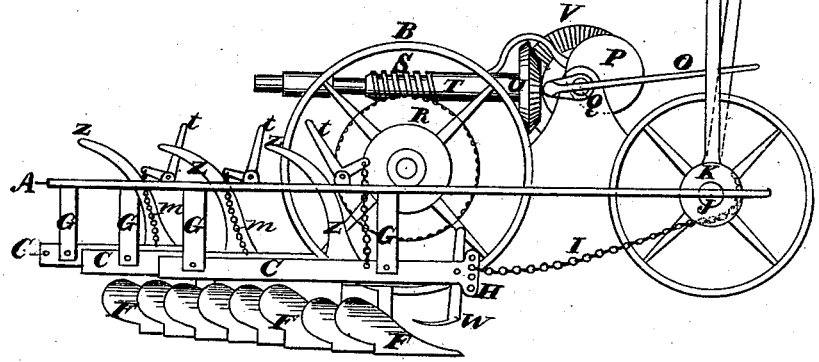
Figure 2:
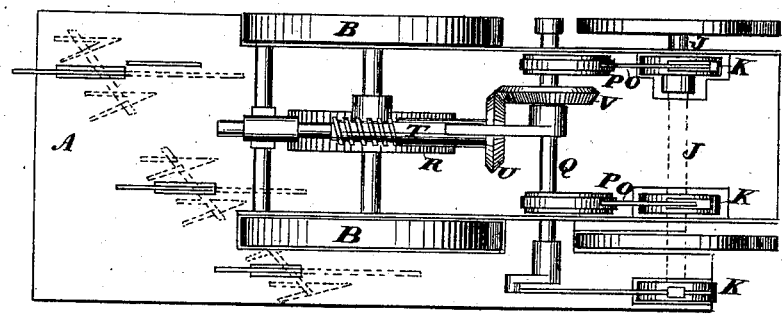
Figure 3:
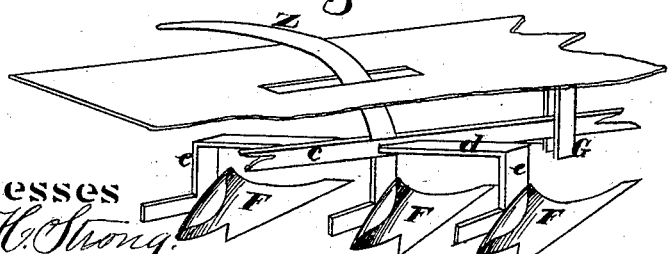

Figure 1 is a side elevation of my machine. Fig. 2 is a plan view. Fig. 3 is a view of the plows and their elevating attachments.

A is the platform or frame of the wagon to which the plowing apparatus is connected, and B B are the bearing-wheels. The forward wheels of the wagon can be mounted as steering or swivel wheels in the ordinary way, in order to facilitate the turning of the wagon. This, however, is not represented in the present case. Underneath this platform or frame I mount in the following manner the series of plows which are to be operated. $c$ $c$ $c$ are straight beams of the desired length. Across the middle of each beam I secure an angular cross-bar, $d$, to which the upper ends of the plow-standards $e$ are attached, so that the plows F will stand in the proper relation to each other; or a compound beam might be used in the ordinary manner of constructing gang-plows. One, two, or three plows can be attached to each beam, or even more, if desired; but I shall not use to exceed three to each beam or compound beam. I then secure slotted hangers G G to the under side of the platform or frame A, so that the beam of each plow or gang of plows will fit in the slot in two hangers and be guided by them. One hanger is placed near the forward and another near the rear end of each beam, so that it can move in a straight line forward and back, the hanger serving as guides. The beams C C and their guides or hangers are so arranged that the entire series of plows will stand at an angle across the rear end of the platform behind the bearing-wheels.

It will thus be seen that I arrange two or more gangs of plows in one working series, so that each gang can work independent of any other gang in the series.

The forward end of each beam has a clevis, H, or equivalent draft attachment, formed on or secured to it, so that one end of a chain, I, can be attached to it. Upon the fixed shaft J, which serves as an axle for the forward wheels of the wagon, I place loosely as many wheels K as there are beams C beneath the wagon, and these wheels are so arranged that one will be directly in front of each beam.

In case the forward wheels of the wagon are constructed as steering-wheels, a separate shaft can be used to support the wheels. The chains I, which have one end secured to the forward end of each plow-beam, are then carried forward underneath the wheels K, which are directly in front of them, and their opposite ends are attached to the upper rim or faces of the wheels, as shown. A long lever, M, has its lower end secured to the upper rim of each wheel K, and these levers extend upward to any desired height. Now, it is evident that by giving these levers a back-and-forth movement the wheels K will be given a semi-rotation back and forth on the shaft J, and at each backward movement will wind up or shorten the chains I sufficiently to draw the plows of each gang forward a short distance, while the plows remain stationary during its forward movement. To operate these levers I employ rods O, one of which connects the upper end of each lever with an eccentric, P, on the shaft Q. The shaft Q is driven by a toothed wheel, R, which is fixed upon the axle of the bearing-wheel, and which gears with a worm, S, on the shaft T, the motion being transmitted from the shaft T to the transverse shaft Q by bevel-gears U V. The eccentrics P are so arranged on the shaft Q, that they operate alternately to move the lever M back and forth. The beams C, with their attached plows, will then be moved forward one at a time, and remain stationary, while the lever is making the back or reverse stroke. The mechanism which drives the levers is connected with the driving-shaft of the wagon, so that the progression of the plows and the wagon is equal. At the forward end of each beam I secure an adjustable foot, W, by means of which the depth to which the plows are to run can be regulated. I also provide a curved handle, Z, for each beam, which passes up through the platform A directly above the plows, so that a person standing on the platform can adjust the point of the plows in the ordinary manner of handling a hand-plow. Each beam is connected by means of a chain, $m$, with one arm of a crank-lever, $t$, which is pivoted upon the platform, so that each beam and its gang of plows can be raised entirely out of the ground when desired. The wagon can either be driven by a steam-engine located upon its platform or frame, or by animals, as desired. The ends of the connecting-rods O can be adjusted along the levers M, in order to increase or diminish the leverage.

I thus provide a plowing-machine which will draw a large number of plows with the same power that is required to draw a single gang.

Having thus described my invention, what I claim, and desire to secure by Letters Patent, is—

Two or more guided plow-beams, C, with their attached plows F arranged to be operated in alternation from one main power by means of the chains I, pulley or cranks K, levers M, connecting-rods O, and eccentrics P, all combined and arranged to be driven by the shaft Q, substantially as and for the purpose described.

In witness whereof, I hereunto set my hand and seal.

THEODORE C. STARK. [L. S.]

Witnesses:
F. L. CARLTON,
E. T. STARR.